United States Patent
Fox et al.

(10) Patent No.: US 9,957,052 B2
(45) Date of Patent: May 1, 2018

(54) AIRCRAFT ENVIRONMENTAL CONTROL SYSTEM THAT OPTIMIZES THE PROPORTION OF OUTSIDE AIR FROM ENGINES, APU'S, GROUND AIR SOURCES AND THE RECIRCULATED CABIN AIR TO MAINTAIN OCCUPANT COMFORT AND MAXIMIZE FUEL ECONOMY

(71) Applicant: HONEYWELL INTERNATIONAL INC., Morristown, NJ (US)

(72) Inventors: Richard B. Fox, San Tan Valley, AZ (US); Bijan F. Hagh, Newport Beach, CA (US); Mike Koerner, Rancho Palos Verdes, CA (US); Stephen Yates, South Barrington, IL (US); Peter M. Michalakos, Arlington Heights, IL (US); Russell W. Johnson, Elmhurst, IL (US)

(73) Assignee: HONEYWELL INTERNATIONAL INC., Morris Plains, NJ (US)

( * ) Notice: Subject to any disclaimer, the term of this patent is extended or adjusted under 35 U.S.C. 154(b) by 340 days.

(21) Appl. No.: 14/606,315

(22) Filed: Jan. 27, 2015

(65) Prior Publication Data
US 2016/0214723 A1    Jul. 28, 2016

(51) Int. Cl.
*B64D 13/06* (2006.01)

(52) U.S. Cl.
CPC ...... *B64D 13/06* (2013.01); *B64D 2013/0603* (2013.01); *B64D 2013/0637* (2013.01);
(Continued)

(58) Field of Classification Search
CPC ............ B64D 13/06; B64D 2013/0603; B64D 2013/0637; B64D 2013/0688; B64D 2013/0692; Y02T 50/56; B01D 2259/4575
(Continued)

(56) References Cited

U.S. PATENT DOCUMENTS

| 4,742,761 | A |   | 5/1988 | Horstman |
| 4,966,005 | A | * | 10/1990 | Cowell ................ B64D 13/06 |
|   |   |   |   | 62/172 |

(Continued)

FOREIGN PATENT DOCUMENTS

| DE | 102009017932 B4 | 11/2010 |
| KR | WO2011/145781 A1 | 11/2011 |

(Continued)

OTHER PUBLICATIONS

Fox, Assessing Aircraft Supply Air to Recommend Compounds for Timely Warning of Contamination, Dissertation submitted to Northcentral University, Apr. 2012.

(Continued)

*Primary Examiner* — Gregory Huson
*Assistant Examiner* — Elizabeth M May
(74) *Attorney, Agent, or Firm* — Shimokaji IP

(57) ABSTRACT

An Environmental Control System includes sensors, an air purification subsystem, and a controller in communication with the sensors and air purification subsystem. The sensors detect contaminants in outside air supplied through engine and APU bleeds or other air sources including ground supplies and electric compressors, contaminants in recirculated air, particulates in outside air, carbon dioxide in recirculated air, temperature in an environment, and pressure in an environment. These sensed parameters are compared (Continued)

against thresholds. Based on the comparisons, changes to the outside air and/or recirculated air are made.

18 Claims, 4 Drawing Sheets

(52) U.S. Cl.
CPC .............. *B64D 2013/0688* (2013.01); *B64D 2013/0692* (2013.01); *Y02T 50/56* (2013.01)

(58) Field of Classification Search
USPC .......................................................... 95/8, 12
See application file for complete search history.

(56) References Cited

U.S. PATENT DOCUMENTS

| | | | |
|---|---|---|---|
| 5,725,425 A | 3/1998 | Rump | |
| 5,750,999 A | 5/1998 | Fox | |
| 6,526,775 B1* | 3/2003 | Asfia | B64D 13/06 62/401 |
| 6,711,470 B1* | 3/2004 | Hartenstein | F24F 11/0017 236/49.3 |
| 7,089,747 B2 | 8/2006 | Fox | |
| 7,122,065 B2 | 10/2006 | Fox | |
| 7,143,631 B2 | 12/2006 | Nurcombe | |
| 7,803,039 B2 | 9/2010 | Inoue | |
| 7,824,479 B2* | 11/2010 | Rowley | G01N 1/2273 95/1 |
| 7,833,305 B1 | 11/2010 | Studer | |
| 7,871,038 B2 | 1/2011 | Space | |
| 2007/0084938 A1* | 4/2007 | Liu | B64D 13/06 236/91 D |
| 2008/0283663 A1* | 11/2008 | Space | B64D 13/06 244/118.5 |
| 2009/0084896 A1* | 4/2009 | Boucher | B64D 13/08 244/118.5 |
| 2013/0030718 A1 | 1/2013 | Williams | |
| 2013/0327891 A1 | 12/2013 | Zhang | |

FOREIGN PATENT DOCUMENTS

| | | |
|---|---|---|
| WO | 0241095 A1 | 5/2002 |
| WO | 2008084432 A1 | 7/2008 |

OTHER PUBLICATIONS

Parthasarathy, Ventilation Relevant Contaminants of Concern in Commercial Buildings Screening Process and Results, Ernest Orlando Lawrence Berkeley National Laboratory, Apr. 29, 2011.
Hall, A Portable Wireless Particulate Sensor System for Continuous Real Time Environmental Monitoring, Boise State University ScholarWorks, Jul. 15, 2012.
Hall, Monitoring Aircraft Cabin Particulate Matter Using a Wireless Sensor Network, Boise State University Scholar Works, Jul. 14, 2013.
Abraham, The biological and toxicological activity of gases and vapors, Toxicology in Vitro 24 (2010) 357-362.
Devos, Standardized Human Olfactory Threshold, IRL Press, Oxford University Press, 1990.
Logue, Hazard Assessment of Chemical Air Contaminants Measured in Residences, Ernest Orlando Lawrence Berkeley National Laboratory, Jun. 2010.
Molhave, Human Reactions to Low Concentrations of Volatile Organic Compounds, Environmental International, vol. 12, pp. 167-175, 1986.
The PID Handbook, Third Edition, RAE Systems Inc., 2013.
BASF Aerospace Materials, Dual Ozone/VOC catalytic converter, Aug. 2011.
Grady, Vehicle Cabin Air Quality with Fractional Air Recirculation, SAE International, Apr. 8, 2013.
RAE Systems, http://www.raesystems.com/sites/default/files/content/resources/Technical-Note-106_A-Guideline-for-Pid-Instrument-Response_07-14.pdf (Jan. 18, 2015).
Extended European Search Report dated Jun 8, 2016 for EP application No. 16152656.1.

* cited by examiner

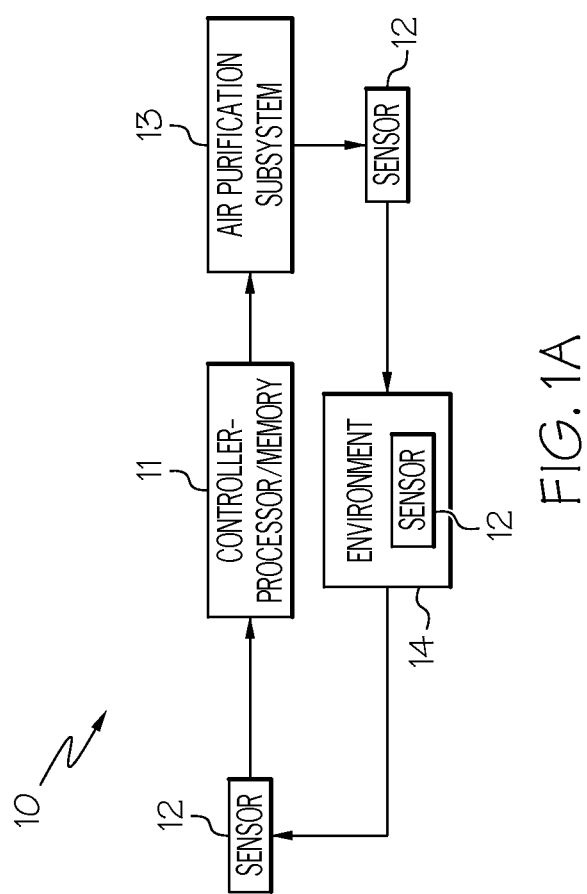

| SENSOR | SIGNAL | RESPONSE |
|---|---|---|
| CABIN PRESSURE | BELOW PRESSURE TARGET | INCREASE BLEED FLOW AS REQUIRED TO REACH TARGET PRESSURE |
| | ABOVE PRESSURE TARGET | ALLOW BLEED FLOW REDUCTION TO MINIMUM SETTING |
| CABIN TEMPERATURE | ABOVE TEMPERATURE SET POINT | INCREASE BLEED FLOW AS REQUIRED TO REACH TARGET TEMPERATURE |
| | BELOW TEMPERATURE SET POINT | ALLOW BLEED FLOW REDUCTION TO MINIMUM SETTING & ADD TRIM AIR AS NEEDED |
| $CO_2$ & CO SENSORS | ABOVE $CO_2$ OR CO THRESHOLD | INCREASE BLEED FLOW AS REQUIRED TO REACH $CO_2$ OR CO THRESHOLD |
| | BELOW $CO_2$ OR CO THRESHOLD | ALLOW BLEED FLOW REDUCTION TO MINIMUM SETTING |
| PARTICULATE SENSOR | ABOVE PARTICULATE THRESHOLD | REDUCE BLEED FLOW TO MINIMUM SETTING & INCREASE TEMPERATURE SET POINT |
| | BELOW PARTICULATE THRESHOLD | ALLOW NORMAL BLEED FLOW ADJUSTMENTS & NORMAL TEMPERATURE SET POINT |
| VOLATILE ORGANIC COMPOUND SENSOR | ABOVE VOC THRESHOLD | MAXIMIZE PURIFICATION OF RECIRCULATED AIR & INCREASE BLEED FLOW TO MAXIMUM LEVEL |
| | BELOW VOC THRESHOLD | MINIMIZE PURIFICATION OF RECIRCULATED AIR & ALLOW NORMAL BLEED FLOW ADJUSTMENTS |
| OZONE | ABOVE OZONE THRESHOLD | DECREASE BLEED AIR FLOW AS REQUIRED TO REACH OZONE THRESHOLD |
| | BELOW OZONE THRESHOLD | ALLOW BLEED AIR FLOW TO INCREASE AND DECREASE NORMALLY |

TABLE 1

| CONTROL FUNCTION | CONTROL LOGIC |
|---|---|
| BLEED FLOW CONTROL | SET TO MAXIMUM LEVEL IF OZONE IS BELOW THRESHOLD AND: CABIN PRESSURE BELOW TARGET CABIN TEMPERATURE ABOVE SET POINT $CO_2$ OR CO LEVEL ABOVE THRESHOLD VOC LEVEL ABOVE THRESHOLD OTHERWISE SET TO MINIMUM LEVEL |
| RECIRCULATION FAN | ADJUST RECIRCULATION FLOW INVERSELY WITH BLEED FLOW TO MAINTAIN CONSTANT TOTAL VENTILATION FLOW |
| RECIRCULATION AIR PURIFICATION | MAXIMIZE PURIFICATION IF VOCS EXCEED THRESHOLD OTHERWISE MINIMIZE PURIFICATION |

TABLE 2

FIG. 2B

AIRCRAFT ENVIRONMENTAL CONTROL SYSTEM THAT OPTIMIZES THE PROPORTION OF OUTSIDE AIR FROM ENGINES, APU'S, GROUND AIR SOURCES AND THE RECIRCULATED CABIN AIR TO MAINTAIN OCCUPANT COMFORT AND MAXIMIZE FUEL ECONOMY

BACKGROUND OF THE INVENTION

The present invention generally relates to apparatus and methods for treatment of airstreams in an adaptive Environmental Control System (ECS) to remove contaminants and change other air characteristics.

ECSs of various types and complexity are used in military and civil airplane, helicopter, and spacecraft applications. In aircraft for example, airflow from outside the aircraft supplied through engine or APU bleeds or other air sources including ground supplies and electric compressors, may be circulated to occupied compartments, cargo compartments, and electronic equipment bays. Air containing many pollutants such as particulate matter, aerosols, and hydrocarbons, may range in humidity from dry (<2%) to very humid and may be delivered in a heated condition to the cabin from the ECS.

Aircraft occupants are not exposed to a single chemical in isolation, and the effects of co-exposures to multiple chemicals are poorly understood. Exposure duration for crews can be 14+ hours. Crews can routinely be assigned to work a 14 hour duty day without a break. The duty day can be extended if there is a maintenance delay or weather. Some international crews are assigned to work a longer duty day. There are flight safety and security implications for not adequately protecting pilots (who must perform cognitively-demanding safety-sensitive flight duties) and cabin crew (who must maintain cabin safety and security). Specifically, manufacturers are currently required to ensure that aircraft systems are designed to provide—in operation, under normal conditions and during any probable failure—"a sufficient amount of uncontaminated air to enable the crewmembers to perform their duties without undue discomfort or fatigue, and to provide reasonable passenger comfort." It has been widely recognized by air accident investigators, regulators, and pilot groups that flight safety can be compromised when pilots are exposed to oil-based contaminants in the ventilation air. Requiring pilots to rely on their noses to identify the presence and location of bleed air contaminants prolongs the exposure for the pilots and/or cabin occupants, depending on the location of the contaminant source.

The industry accepted approach to verification of acceptability of aircraft cabin air quality has been to gather air samples through various forms of sample media to capture the range of contaminants that might be present. There are three US Environmental Protection Agency (EPA) methods that are accepted as guidance for sample collection and analysis for volatile and semi-volatile compounds and for aldehyde compounds that may create odor and create irritancy.

The sample methodology is inadequate to fully characterize all compounds with any given method, thus requiring the use of multiple, real time sensors and methods. The analyst must also determine—based on equipment availability and laboratory capability—which methods to use.

As can be seen, there may be an ongoing need to interpret real-time air contaminant data and/or other air characteristics, and provide an indication of when the levels may increase beyond the range of acceptability to enable corrective action.

SUMMARY OF THE INVENTION

In one aspect of the present invention, an environmental control system (ECS) having contaminated supply air that flows into an environment, comprises an outside air contaminant sensor that senses contaminants in outside air that may mix with contaminated, recirculated air and be delivered back to the cabin, wherein the outside air is supplied through engine or APU bleeds or other air sources including ground supplies and electric compressors, of the ECS, wherein the outside air contaminant sensor is upstream of the environment; a recirculated air contaminant sensor that senses contaminants in recirculated air that is another part of the contaminated supply air, wherein the recirculated air is supplied by the environment, wherein the recirculated air contaminant sensor is downstream of the environment; a pressure sensor that senses pressure of the supply air in the environment, wherein the pressure sensor is located in the environment; a temperature sensor that senses temperature of the supply air in the environment, wherein the temperature sensor is located in the environment; carbon dioxide, carbon monoxide, and ozone sensors that sense carbon dioxide, carbon monoxide, and ozone in the recirculated air exiting the environment, wherein the carbon dioxide sensor is downstream of the environment; and a controller in communication with the outside air contaminant sensor, the recirculated air contaminant sensor, the pressure sensor, the temperature sensor, and the carbon dioxide sensor; wherein, upon receipt of a threshold signal from one of the sensors, the controller controls an inflow of the outside air supplied through engine or APU bleeds or other air sources including ground supplies and electric compressors, that mixes with the recirculated air.

In another aspect of the present invention, a controller for an environmental control system (ECS) having a plurality of sensors and an air purification subsystem, wherein the controller communicates with the plurality of sensors and air purification subsystem; receives one of a contaminant signal and an air characteristic signal; wherein the contaminant signal is one of: a outside air contaminant signal; a recirculated air contaminant signal; a carbon monoxide signal; a carbon dioxide signal; and an ozone signal; wherein the air characteristic signal is one of: a temperature signal; and a pressure signal; upon receipt of one of the contaminant signal and the air characteristic signal, commands the air purification subsystem to alter a condition of contaminated air in the ECS.

In yet another aspect of the present invention, a method for controlling an occupant comfort level in an environment comprises sensing outside air contaminants in outside air supplied through engine or APU bleeds or other air sources including ground supplies and electric compressors, entering the environment; comparing the sensed outside air contaminants against an outside air contaminant threshold; sensing recirculated air contaminants in recirculated air entering the environment; comparing the sensed recirculated air contaminants against a recirculated air contaminant threshold; sensing carbon dioxide in recirculated air exiting the environment; comparing the sensed carbon dioxide against a carbon dioxide threshold; sensing temperature of mixed air in the environment, wherein the mixed air includes the outside air supplied through engine or APU bleeds or other air sources including ground supplies and electric compressors, and the recirculated air; comparing the sensed temperature against a temperature threshold; sensing pressure of the mixed air in the environment; comparing the sensed pressure against a pressure threshold; commanding one of: a change in an amount of outside air entering the environment; a change in an amount of recirculated air entering the environment; and a change in temperature of mixed air entering the environment.

These and other features, aspects and advantages of the present invention will become better understood with reference to the following drawings, description and claims.

BRIEF DESCRIPTION OF THE DRAWINGS

FIG. 1A is a block diagram of an environmental control system according to an exemplary embodiment of the present invention;

FIG. 2B is a table of control logic steps that can be implemented as part of the method of FIG. 2A according to an exemplary embodiment of the present invention;

DETAILED DESCRIPTION OF THE INVENTION

Figure 1B:
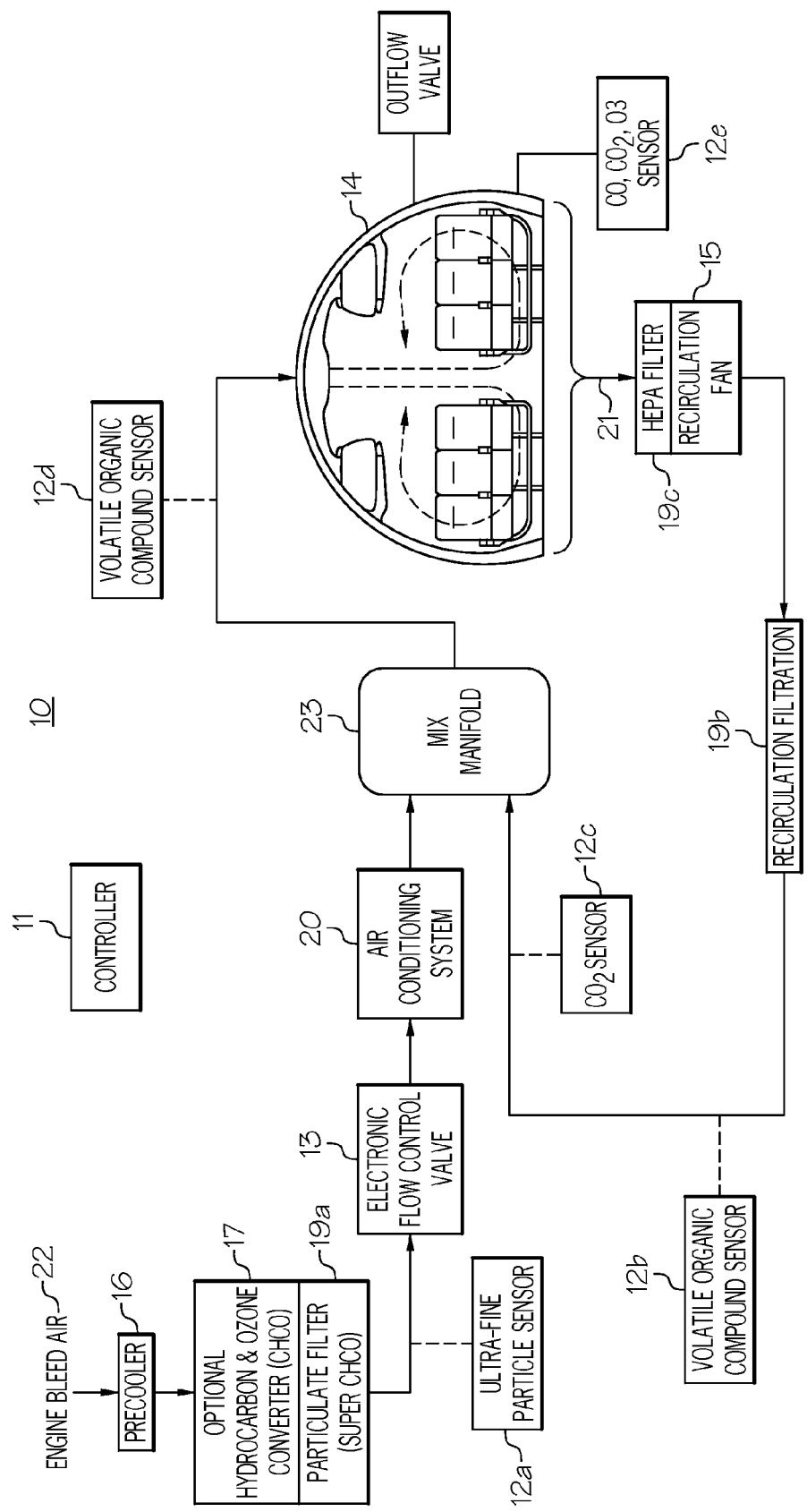
FIG. 1B is a block diagram of an environmental control system that can be implemented in the system of FIG. 1A according to an exemplary embodiment of the present invention.

The following detailed description is of the best currently contemplated modes of carrying out the invention. The description is not to be taken in a limiting sense, but is made merely for the purpose of illustrating the general principles of the invention, since the scope of the invention is best defined by the appended claims.

Various inventive features are described below that can each be used independently of one another or in combination with other features. However, any single inventive feature may not address any of the problems discussed above or may address only one of the problems discussed above. Further, one or more of the problems discussed above may not be fully addressed by any of the features described below.

As will be appreciated by one skilled in the art, aspects of the present invention may be embodied as a system, method, or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable media having computer readable program code embodied thereon.

Any combination of one or more computer readable storage media may be utilized. A computer readable storage medium is an electronic, magnetic, optical, or semiconductor system, apparatus, or device, or any suitable combination of the foregoing. More specific examples (a non-exhaustive list) of the computer readable storage medium would include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium is any tangible medium that can store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the users computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable storage medium that can direct a computer, other programmable data processing apparatus, or other devices to function in a particular manner, such that the instructions stored in the computer readable storage medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The present invention generally provides an environmental control system (ECS) that can continuously adapt to changing contaminants—both in kind and degree—in contaminated air in the ECS. The ECS can also continuously adapt to changing air characteristics—both in kind and degree—such as air temperature and pressure. The contaminated air may include outside air entering the ECS supplied through engine or APU bleeds or other air sources including ground supplies and electric compressors, as well as recirculating air in the ECS.

A controller of the ECS may receive contamination signals from one or more sensors that sense one or more contaminants in the contaminated air. The sensors may also sense total mass of the contaminants—without regard to the specific contaminants being sensed. The controller may also receive characteristic signals from one or more sensors that may sense air characteristics—without regard to the contaminants.

One or more of these contamination signals and/or characteristic signals can then be compared against a predicted sensory response threshold and/or an average sensory response threshold. If the threshold is exceeded, the controller may send control signals to an air purification subsystem of the ECS to alter, for example, pressure, temperature, outside air, or recirculating air entering, for example, an environment, or modulating the control of air purification devices. The environment may be a cabin of an aircraft or other vehicle, or other space such as a building intended to be occupied by humans. Once the contamination and/or characteristic signal(s) drops below the threshold, the controller may discontinue commanding the alteration of the contaminated air.

Generally, the present invention can include determining one or more sensory thresholds for air components (i.e., contaminants), such as odor detection thresholds, sensory irritancy thresholds, mass contaminant thresholds, carbon monoxide thresholds, carbon dioxide thresholds, and ozone thresholds. The sensory thresholds may also be for air characteristics, such as temperature thresholds and pressure thresholds. Based on one or more of the thresholds, the present invention may then predict one or more predicted sensory response thresholds. The predicted sensory response threshold can then be used to continuously compare it against actual levels of components and/or characteristics in the ECS air, and thus enable continuous control of contaminants and/or characteristics in the environment.

FIG. 1 is a block diagram of an ECS 10 according to an exemplary embodiment of the present invention. The ECS 10 may include a controller 11, such as a computer having a processor and a memory, in continuous or intermittent communication with an air purification subsystem 13 and one or more sensors 12. The sensors 12 may be positioned in various points throughout the ECS to sense contaminants in, and/or air characteristics of, the outside air supplied through engine or APU bleeds or other air sources including ground supplies and electric compressors, and/or recirculating air in the ECS and/or, in particular, an environment 14, such an aircraft cabin. The contaminants in the ECS may include, for example, VOCs, SVOCs, ultrafine particles (UFPs), carbon monoxide, carbon dioxide, and ozone.

One or more of the sensors 12 can be any sensor capable of sensing the anticipated contaminants in the contaminated air. One or more of the sensors can sense the identity and amount of the individual contaminants in the contaminant air. In addition, one or more sensors can sense the mass of the contaminants without regard to the specific identity of the individual contaminants. For example, to sense individual contaminants, the sensor 12 may be a photoionization detector (PID), such as a PID, ppbRAE 3000, by RAE Systems of San Jose, Calif. To sense total mass of contaminants, the sensor may also be a PID. These types of sensors and their operation is described in the PID Handbook (Third Edition), by RAE Systems Inc., which is incorporated herein by reference in its entirety.

Similarly, one or more of the sensors 12 can be any sensor capable of sensing anticipated air characteristics, such as temperature and pressure or gas composition, of the contaminated air. For example, to sense temperature and pressure, part numbers 51090026-51 and 1090030-51 by Honeywell for temperature and pressure sensors could be used.

The controller 11 can include a processor and a memory that can store instructions to be executed by the processor to implement a method of removing contaminants from, and/or change air characteristics in, a space to be occupied by humans, such as the cabin of an aircraft, according to the present invention. The controller 11 may receive contamination signals from sensor(s) 12 which may sense contaminants from, for example, a cabin filter, a filter to a mix manifold 23, an ECS pack to the mix manifold 23, and the mix manifold 23 to the cabin. The controller 11 may also receive contamination signals from sensor(s) 12 which may sense contaminants in bleed air 22 coming from, for example, one or more engines and/or an auxiliary power unit (APU). Likewise, the controller 11 may receive characteristic signals from sensor(s) 12 which may sense air characteristics from, for example, the cabin.

The controller 11 may then compare the contamination signals and/or characteristic signals to one or more threshold signals that may relate to, for example, cabin pressure, cabin temperature, particulate mass and VOC concentrations. In the example of mass and/or VOC concentrations, the controller 11 may compare contamination signals to a contaminant concentration look up table that may have information/data of contaminant concentration equivalents versus percentile of a sample database. The controller 11 may, in addition to or in lieu of the foregoing comparison, compare contamination signals to a contaminant mass look up table that may have information/data of total mass of contaminants versus percentile of a sample database that may or may not the be same sample database in look up table. The foregoing data and comparisons are described, for example, in U.S. patent application Ser. No. 14/606,617, entitled "Human Factors Approach to Control Contaminant Concentrations in Aircraft Supply Air from Engine Bleed and Ground Sources, and in Recirculated Air Being Delivered to Aircraft Cabins for the Optimization of User Experience and Energy Consumption," filed concurrently with this application and incorporated herein by reference in its entirety.

In the example of air characteristics, the controller may compare air characteristic signals to a temperature look up table that may have information/data of temperature requirements in a cabin as promulgated by a government agency. A similar comparison may occur for the air characteristic of pressure in a cabin.

FIG. 1B is an exemplary embodiment of the ECS 10 depicted in FIG. 1A. The controller 11 may control one or more of the components and/or subsystems of the ECS 10. The ECS 10 may include a pneumatic bleed air precooler 17 that cools outside or bleed air 22 supplied through engine or APU bleeds or other air sources including ground supplies and electric compressors, entering the ECS 10. The outside air 22 supplied through engine or APU bleeds or other air sources including ground supplies and electric compressors, may have contaminants that, at certain levels, may be undesirable for occupants in the environment 14. The pneumatic bleed air precooler 17 may be of any design well known in the art, such as a pneumatic bleed air precooler made by Honeywell International Inc. ("Honeywell"), part number 2341788-1. The pneumatic bleed air precooler 17 may cause a cooling in air temperature wherein the upon cooling the temperature of the air exiting the pneumatic bleed air precooler 16 can be, in embodiments, in a range of from about 135° C. to about 260° C., or from about 135° C. to about 200° C., or from about 135° C. to about 150° C.

A hydrocarbon and ozone converter 18 may receive air from the precooler 17 and convert hydrocarbons and ozone in the air to compounds that are believed to be non-harmful to humans. The converter 18 may be of any design well known in the art, such as an ozone converter made by Honeywell, part number 2341590-1, or a volatile organic compound and ozone converter made by Honeywell, part number 67200008-00. The converter 18 may convert a percentage of the total hydrocarbons wherein, in embodiments, the amount of hydrocarbons in the air exiting the converter 18 may be in a range of from about 0 ug/M3 to about 4000 ug/M3, or from about 0 ppmV to about 0.5 ppmV isobutylene equivalents, or from about 0 ug/M3 to about 500 ug/M3 isobutylene equivalents, or from about 0 ppmV isobutylene equivalents to about 0.1 ppmV isobutylene equivalents. The converter 18 may convert a percentage of the total ozone wherein the amount of ozone in the air existing the converter 18 may be, in embodiments, in a range of from about 0 ppmV to about 0.1 ppmV, or from about 0 ppmV to about 0.25 ppmV.

A particulate filter 19a may receive air from the converter 18 to filter out particulates of a desired size. In embodiments, the particulates exiting the filter 19a can be, in embodiments, of a size of from about 0 um to about 0.3 um for 99% HEPA filtration at 0.3 um. The filter 19a may be of any design well known in the art, such as a filter made by Honeywell SP Defense under the trade name FMM7™.

A particle sensor 12a may be downstream of the filter 19a to sense a particle count per cubic centimeter or contaminant mass concentration in the air flow control valve 13. The particle count concentration or mass contaminant concentration may be for one or more contaminants—for example, contaminants including but not limited to VOCs adhered to carbon and SVOC aerosol. For example, the sensor 12a may sense particle count or concentrations, in embodiments, of from about 0 articles/cm$^3$ to about 1,000,000 particles/cm$^3$ (for aircraft takeoff), or from about 0 particles/cm$^3$ to about 400,000 particles/cm$^3$ (for aircraft landing), or from about 0 particles/cm$^3$ to about 800,000 particles/cm$^3$ (for aircraft descent), or from about 0 particles/cm$^3$ to about 100,000 particles/cm$^3$ (for aircraft cruise) or a mass concentration of from about 0 ug/M3 to about 100,000 ug/M3, or from about 0 ug/M3 to about 4000 ug/M3, or from about 0 ug/M3 to about 500 ug/M3, or from about 250 ug/M3 to about 400 ug/M3. The sensor 12a may then send intermittent or continuous particle count or mass contaminant concentration signals to the controller 11, such as when the mass contaminant concentration exceeds/equals a threshold and/or falls below a threshold.

A flow control valve 13 may be downstream of the sensor 12a to control the amount and/or rate of air from the filter 19a, to an air conditioning system 20, and eventually to an environment 14. The valve 13 may receive command signals from the controller 11 to alter the air flow amount or rate entering the air conditioning system 20. The valve 13 may change or meter a rate of air flow wherein, in embodiments, a flow rate is of from about 0 to about 5000 cubic feet per minute recirculation flow (for a large wide body aircraft), or from about 0 to about 2500 cubic feet per minute recirculation flow (for a narrow body aircraft), or from about 0 to about 300 M3 per hour for a single filter. The size and number of filters is changed to maintain filter face velocity within allowable filter performance requirements. The valve 13 may be of any design well known in the art, such as a 3.0 inch diameter electric motor modulating valve, part number 3205034-4, made by Honeywell.

An air conditioning subsystem 20 may be downstream of the valve 13. The subsystem 20 may alter the temperature and/or pressure of the air from the valve 13, and may be, for example, Engine Bleed Air System, Pneumatic Air Distribution System, Honeywell PN 6217C000-016 might be used. In embodiments, the air exiting the subsystem 20 may have a temperature of from about −10° C. to about 0° C., or from about 5° C. to about 27° C., or from about 15° C. to about 25° C. and mixed with hot bleed air 22 to obtain supply temperatures within about 18° C. to about 29° C. In embodiments, the air exiting the subsystem 20 may have a pressure of from about 11 psia to about 15 psia, or from about 12 psia to about 15 psia, or from about 13 psia to about 15 psia.

A mix manifold 23 may be downstream of the air conditioning subsystem 20. The manifold 23 can mix air from the air conditioning subsystem 20 and the cabin recirculation fan (such as a fan by Honeywell, part number 606772-1) and distribute it to the cabin 14. The hot trim air (bleed air) 22, controlled by a valve (such as a 2 inch diameter trim air valve by Honeywell, part number 3291978-00), can be inserted into the cool air from the mix manifold 23 prior to entering the cabin to control air temperature within a range of from about 18° C. to about 29° C. (for normal aircraft operating conditions), or from about 15° C. to about 20° C. (to precool the cabin), or from about 30° C. to about 40° C. (to pre-heat the cabin). For example, the ratio of volume of outside air 22 supplied through engine or APU bleeds or other air sources including ground supplies and electric compressors, to volume of recirculated air 21 may be, in embodiments, of from about 60 to about 100% (in normal aircraft operation), or from about 0% (if there was an adverse contamination event outside the aircraft, such as aircraft de-icing) to about 100%. The manifold 23 may be of any design well known in the art, such as a manifold made by Triumph Group.

A sensor 12d, such as a VOC sensor, may be downstream of the mix manifold 23. Although referred to as a VOC sensor, the sensor 12d is not intended to be limited to VOCs, but may also sense a combination of VOCs and SVOCs as an example. The sensor 12d may sense concentrations of one or more contaminants to verify that the mixed air exiting the manifold 23 meets certain requirements for occupant comfort in the environment 14. The requirements may be government regulatory requirements that address maximum limits for, example, CO, CO2, ozone, VOC, SVOC, and particulates. In other words, the maximum limits can be thresholds that should not be exceeded. Accordingly, for example, the sensor 12d may sense contaminant concentrations, in embodiments, of from about 0 ppmV to about 1 ppmV, or from about 0 ug/M3 to about 4000 ug/M3, or from about 0 UFP/cm3 to about 500,000 UFP/cm3. The sensor 12d may then send intermittent and/or continuous concentration contamination signals to the controller 11, particularly when the contaminant concentration exceeds/equals a threshold and/or falls below a threshold.

From the sensor 12d, the mixed air from the manifold 23 may enter the environment 14 where additional contaminants may be added to the air. As an example, the additional contaminants may come from occupants in the environment 14.

One or more sensors 12e may be within the environment 14 to sense air characteristics, such as temperature and/or pressure, of the mixed air in the environment 14. Thus, the sensor(s) 12e may verify that the mixed air meets certain requirements, such as government regulatory requirements, or does not exceed maximum limits, for occupant comfort in the environment 14. In other words, the maximum limits can be thresholds that should not be exceeded. Accordingly, for example, a sensor 12e may sense temperature, in embodiments, of from about 18° C. to about 29° C. As another example, a sensor 12e may sense pressure, in embodiments, of from about 11 psia to about 15 psia, or from about 12 psia to about 15 psia, or from about 13 psia to about 15 psia. The sensor(s) 12e may then send intermittent and/or continuous air characteristic signals to the controller 11, particularly when one or more characteristics exceed/equal one or more thresholds and/or fall below one or more thresholds.

Recirculated air 21 from the environment 14 may then exit to a filter 19c, which may be a high efficiency particulate absorption (HEPA) filter of any design well known in the art, such as a filter made by I Honeywell under the trade name FMM7. The filter 19a may remove particulates from the recirculated air 21 of a desired size, such as, in embodiments, particulates of a size of from about 0 um to about 0.3 um at 99% removal efficiency.

A recirculation fan 15 may be downstream of the filter 19c to modulate the flow of recirculation air 21 inversely with outside air 22 supplied through engine or APU bleeds or other air sources including ground supplies and electric compressors, and thereby maintain a ventilation rate of the recirculation air 21 exiting the environment 14. As an example, a ventilation rate may be in embodiments of from about 0 to about 5000 CFM for total recirculation flow (for a large wide body aircraft), or from about 0 to about 2500 CFM (for a narrow body aircraft), or sufficient filter area to maintain about 400 feet per minute filter face velocity. The fan 15 may be of any design well known in the art, such as a fan made by Honeywell, part number 606772-1.

A recirculation filter 19b may be downstream of the fan 15. The filter 19b may remove particulates from the recirculated air 21 of a desired size, such as, in embodiments, particulates of a size of from about 0 to about 0.3 um at 99% removal efficiency, or from about 0 to about 1 um at 97% efficiency, or from about 0 to about 2.5 um for non-HEPA filtration. The filter 19b may be of any design well known in the art, such as a filter made by Honeywell under the trade name FMM7.

A sensor 12b, such as a VOC sensor, may be downstream of the filer 19b. The sensor 12b may sense concentrations of one or more VOCs in the recirculated air 21. Although referred to as a VOC sensor, the sensor 12b is not intended to be limited to VOCs, but may also sense SVOCs. For example, the sensor 12b may sense VOC contaminant concentrations from about 0 ppmV to about 1 ppmV, or from about 0 ug/M3 to about 4 ug/M3, or from about 0 UFP/CM3 to about 500,000 UFP/CM3. The sensor 12b may then send a VOC concentration contamination signal to the controller 11.

A sensor 12c, such as a carbon dioxide sensor, may be downstream of the sensor 12b. The sensor 12c may sense concentration of carbon dioxide in the recirculated air 21. For example, the sensor 12c may sense carbon dioxide contaminant concentrations, in embodiments, of from about background (about 400 ppmV) to about 5000 ppmV, or from about 800 ppmV to about 2000 ppmV, or from about 800 ppmV to about 1500 ppmV. The sensor 12c may then send intermittent and/or continuous carbon dioxide concentration contamination signals to the controller 11, particularly when a carbon dioxide concentration exceeds/equals a threshold and/or falls below a threshold. Downstream of the sensor 12c is the mix manifold 23.

As can be seen in FIG. 1B, during operation, the ECS 10 adapts to changing contaminants and/or particulates and/or air characteristics in both the outside air 22 supplied through engine or APU bleeds or other air sources including ground supplies and electric compressors, and recirculated air 21. For example, the changes can occur as an aircraft moves from one operating mode to another, such as from taxing, to takeoff, to cruise at, for example, about 35,000 feet. The ECS 10 adapts to the change by receiving intermittent and/or continuous signals from sensors, such as sensors 12a, 12b, 12c, 12d, and 12e. These signals can be generated when a parameter exceeds/equals a threshold and/or falls below a threshold. In response to a signal, the controller 11 may command a change to the operation of the flow control valve 13, the air conditioning subsystem 20, the mix manifold 23, and/or recirculation fan 15.

Figure 2A:
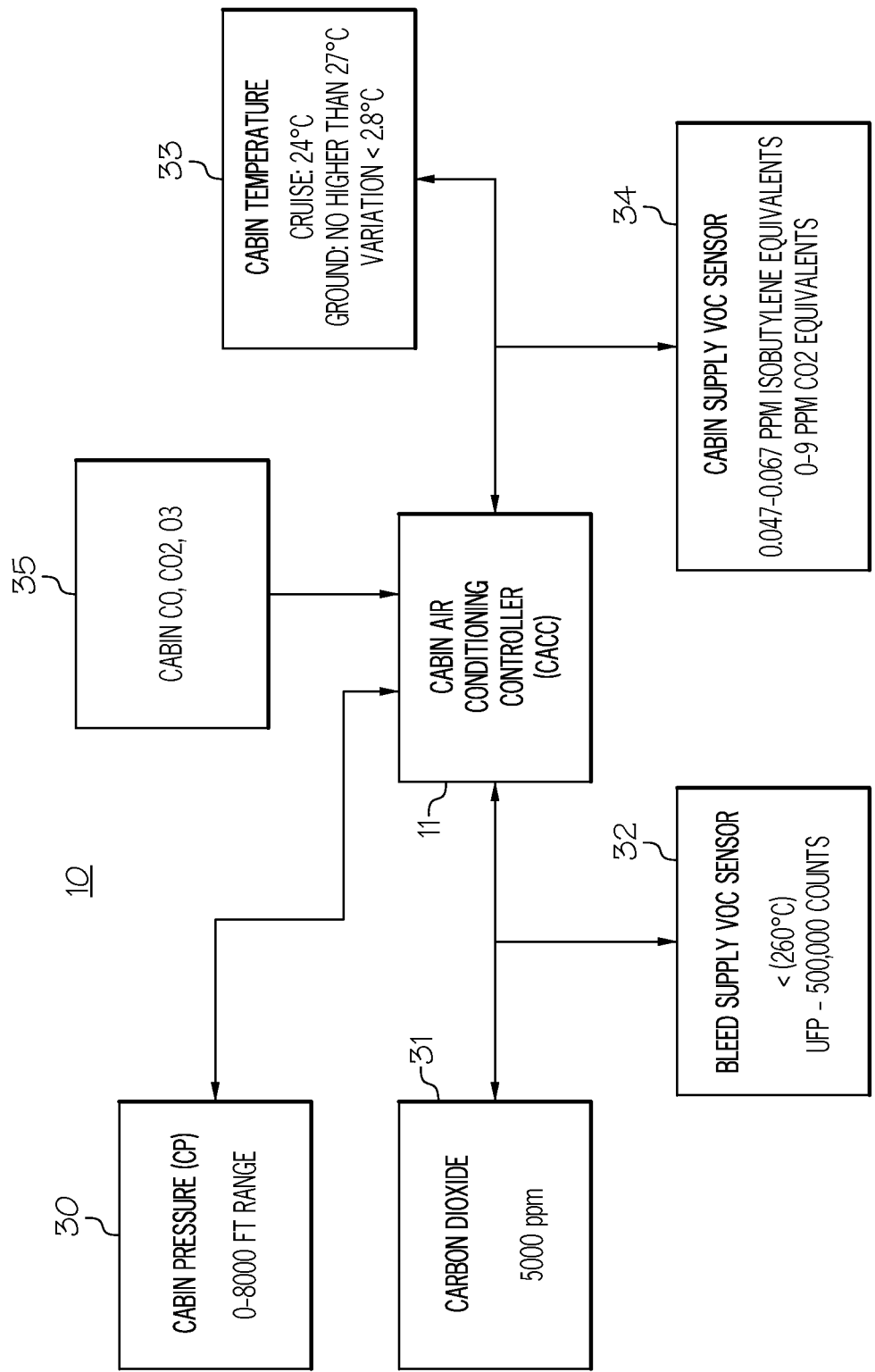
FIG. 2A is a flow chart of a method of controlling contaminants in an environmental control system according to an exemplary embodiment of the present invention.

In an exemplary embodiment of an aircraft, FIG. 2A is a flow chart of how a controller, such as controller 11, may monitor sensors and command operating changes to the ECS components as contaminants and/or particulates and/or air characteristics change in the ECS. The air characteristics depicted in FIG. 2A (e.g., carbon pressure, cabin temperature, etc.) may be altered by altering/changing one or more operating characteristics/parameters of the ECS components described above (e.g., manifold ratio, flow rate, ventilation rate, etc.). Accordingly, the combination of operating characteristics/parameters of the ECS components are not mere design choices.

In FIG. 2A, the controller 11 may control pressure 30 in the cabin 14 as the cabin 14 (i.e., aircraft) moves between, for example, 0 to 35,000 feet in altitude—going from taxi to cruise and then to landing. Thus, the controller 11 may increase and decrease pressure 30 as the cabin changes altitude. For example, the controller 11 may maintain the cabin pressure 30, in embodiments, of from about 11 psia to about 15 psia, which may be equivalent to what an occupant might experience outside of the cabin between 0 to 8000 feet.

The controller 11 may, in embodiments, control carbon dioxide concentration 31 outside of the cabin 14 such that the concentration does not exceed about 5000 ppm. Accordingly, in an exemplary embodiment, if the carbon dioxide concentration in the recirculated air reaches about 2000 ppm, the controller 11 may command that an outside air 22 inflow rate be increased. In another exemplary embodiment, if the carbon dioxide concentration in the recirculated air falls below about 800 ppm, the controller 11 may command that an outside air 22 flow inflow be decreased.

The controller 11 may control cabin temperature 33 in the cabin 14. For example, during cruise of the aircraft, the cabin temperature 33 may have a threshold at about 24° C.; while on the ground, the cabin temperature may have a threshold of no more than about 27° C.; with a temperature variation at all times being less than about 5° C. These temperatures may be maintained by the controller 11 commanding a change in the air conditioning subsystem 20, for example, by decreasing trim air 16 from the hot system, or increasing the cold air from the air cycle machine 20 to maintain the temperature set-point.

The controller 11 may control bleed air VOCs 32 into the cabin 14. In embodiments, the bleed air 22 may be from one or more aircraft engines and/or an APU. In embodiments, when the bleed air 22 is maintained at no more than about 260° C. after exiting the precooler, a particle sensor, such as sensor 12a, may have an ultra-fine particle count threshold of about 200,000 to 250,000 UFP/cm3. In other embodiments, if the particle count for one bleed air source exceeds the particle count of the other bleed air sources—over two flight cycles of take-off and landing—the controller 11 may command the manifold 23 to reduce the bleed air 22, increase the recirculation air 21, and send a note to the flight maintenance system to recommend further evaluation.

The controller 11 may control cabin supply air VOCs 34 coming from the manifold 23 and into the cabin 14. VOC sensors (i.e., contaminant sensors for VOCs and other contaminants) may have, in some embodiments, a threshold of about 0.047 to 0.067 ppm isobutylene equivalents. Isobutylene equivalents are contaminant concentrations converted to a reference compound concentration by a given sensor, and further described in U.S. patent application Ser. No. 14/606,617, entitled "Human Factors Approach to Control Contaminant Concentrations in Aircraft Supply Air from Engine Bleed and Ground Sources, and in Recirculated Air Being Delivered to Aircraft Cabins for the Optimization of User Experience and Energy Consumption," filed concurrently with this application and incorporated herein by reference in its entirety. Similarly, the VOC sensors may have, in some embodiments, a threshold of about 0-9 ppm carbon dioxide equivalents.

In embodiments, VOC sensors may monitor VOCs and other compounds upstream and downstream of air purification filters, such as filters 19b and 19c. In other embodiments, VOC sensors may monitor VOCs and other compounds downstream of an air cycle machine, such as one in the air conditioning subsystem 20. In further embodiments, VOC sensors may monitor VOCs and other compounds at the exit of a mix manifold, such as manifold 23.

The controller 11 may control carbon monoxide, carbon dioxide, and/or ozone in the cabin 14 through the use of one or more sensors. In embodiments, a carbon monoxide threshold may be from about or 9 ppmV (the US EPA recommended limit) to about 50 ppmV (the FAA maximum allowed), a carbon dioxide threshold may be from about 800 ppmV to −2000 ppmV (but not to exceed 5000 ppmV, the FAA limit), and an ozone threshold may be from about 0.1 ppmV to about 0.25 ppmV (for short durations). When one or more of these threshold is exceeded, the controller 11 may command the manifold to increase bleed air 22, according to various embodiments.

FIG. 2B is a table depicting control logic that may be executed by the controller 11 in embodiments of the present invention. Table 1 of FIG. 2B identifies in the first column the sensor in question, in the second column the signal sent by the sensor, and in the third column the response or command by the controller 11 upon receipt of the signal. It can be seen that in the example of Table 1, the signal is either above or below a target or threshold.

However, the present invention contemplates that there can be more than one threshold that triggers the sending of a signal. For example, at above first threshold, a first signal may be sent to the controller 11. At below a second threshold, which is lower than the first threshold, a second signal may be sent to the controller 11.

In Table 1, upon receipt of a signal by the controller 11, the respective response/command, in this exemplary embodiment, is in many instances an increase or decrease in bleed air. However, the present invention contemplates that other responses/commands may occur.

In FIG. 2B, Table 2 includes a first column that identifies control function (i.e., the ECS component being controlled or commanded), while the second column identifies the respective controller logic or commands. The components being controlled and the respective commands are exemplary and others can be within the scope of the present invention.

According to the present invention, fuel consumption by an aircraft, for example, can be reduced by about 0.5 to 1.5%.

It should be understood, of course, that the foregoing relates to exemplary embodiments of the invention and that modifications may be made without departing from the spirit and scope of the invention as set forth in the following claims.

We claim:

1. An environmental control system (ECS) having contaminants in supply air that flows into an environment, comprising:
   an outside air contaminant sensor that senses contaminants in outside air that is a part of the contaminants in supply air, wherein the outside air is supplied by a source outside of the ECS, supplied through engine or APU bleeds or other air sources including ground supplies and electric compressors, wherein the outside air contaminant sensor is upstream of the environment;
   a recirculated air contaminant sensor that senses contaminants in recirculated air that is another part of the contaminants in supply air, wherein the recirculated air is supplied by the environment, wherein the recirculated air contaminant sensor is downstream of the environment;
   a pressure sensor that senses pressure of the supply air in the environment, wherein the pressure sensor is located in the environment;
   a temperature sensor that senses temperature of the supply air in the environment, wherein the temperature sensor is located in the environment;
   a carbon dioxide sensor that senses carbon dioxide in the recirculated air exiting the environment, wherein the carbon dioxide sensor is downstream of the environment; and
   a controller in communication with the outside air contaminant sensor, the recirculated air contaminant sensor, the pressure sensor, the temperature sensor, and the carbon dioxide sensor;
   wherein, upon receipt of a threshold signal from one of the sensors, the controller controls an inflow of the outside air that mixes with the recirculated air by optionally changing the operation of a flow control valve, an air conditioning subsystem, a mix manifold, and a recirculation fan;
   wherein the controller optionally controls the flow control valve, the air conditioning system, the mix manifold, and the recirculation fan by comparing a contamination signal to the threshold signal;

wherein the controller compares the contamination signal to data that includes concentration equivalent versus contaminant population percentiles, wherein the concentration equivalent is a concentration of a compound other than a contaminant that is sensed by the one or more sensors;

wherein the controller uses the concentration equivalent versus contaminant population percentiles to calculate sensory thresholds at contaminant population percentiles;

wherein the flow control valve receives outside air and is located upstream of the environment;

wherein the air conditioning subsystem is downstream of the flow control valve and upstream of the environment;

wherein the mix manifold is downstream of the air conditioning subsystem and upstream of the environment; and wherein the recirculation fan is downstream of the environment and upstream of the mix manifold.

2. The ECS of claim 1, wherein the outside air contaminant sensor comprises an ultra-fine particle sensor.

3. The ECS of claim 1, wherein the outside air contaminant sensor comprises a volatile organic compound sensor.

4. The ECS of claim 1, wherein the recirculated air contaminant sensor comprises a volatile organic compound sensor.

5. The ECS of claim 1, wherein the carbon dioxide sensor is downstream of the recirculated air contaminant sensor.

6. The ECS of claim 1, further comprising a precooler upstream of the outside air contaminant sensor.

7. A controller for an environmental control system (ECS) having a plurality of sensors and an air purification subsystem, wherein the controller:

communicates with the plurality of sensors and air purification subsystem;

receives at least one of a contaminant signal and an air characteristic signal;

wherein the contaminant signal is at least one of:
an outside air contaminant signal;
a recirculated air contaminant signal;
a carbon monoxide signal;
a carbon dioxide signal;
an ultrafine particle sensor signal, and
an ozone signal;

wherein the air characteristic signal is at least one of:
a temperature signal; and
a pressure signal;

upon receipt of at least one of the contaminant signal and the air characteristic signal:
compares at least one of:
the contaminant signal to a constructed database of contaminant concentration equivalents versus contaminant population percentiles, wherein contaminant concentration equivalents are concentrations of a compound other than the contaminant, wherein the contaminant concentration equivalents versus contaminant population percentiles enables calculation of predicted contaminant sensory thresholds at contaminant population percentiles;
the air characteristic signal to a constructed database of total mass of contaminants versus contaminant population percentiles wherein the total mass of contaminants versus contaminant population percentiles enables calculation of predicted mass sensory thresholds at contaminant population percentiles;

upon the comparison, and based upon whether the contaminant signal exceeds one of the predicted contaminant sensory thresholds or whether the air characteristic signal exceeds one of the predicted mass sensory thresholds, commands the air purification subsystem to alter a condition of contaminated air in the ECS.

8. The controller of claim 7, wherein, upon receipt of one of the contaminant signal and the air characteristic signal, commands a flow control valve of the air purification subsystem to alter a flow of outside air supplied through engine or APU bleeds or other air sources including ground supplies and electric compressors, into an environment.

9. The controller of claim 7, wherein, upon receipt of one of the contaminant signal and the air characteristic signal, commands a mix manifold of the air purification subsystem to alter a mix of outside air supplied through engine or APU bleeds or other air sources including ground supplies and electric compressors, and recirculated air into an environment.

10. The controller of claim 7, wherein, upon receipt of one of the contaminant signal and the air characteristic signal, commands a recirculation fan of the air purification subsystem to alter a ventilation rate of recirculated air exiting an environment.

11. The controller of claim 7, wherein, upon receipt of one of the contaminant signal and the air characteristic signal, commands an air conditioning subsystem of the air purification subsystem to alter a temperature of outside air supplied through engine or APU bleeds or other air sources including ground supplies and electric compressors, into an environment.

12. The controller of claim 7, wherein, upon receipt of one of the contaminant signal and the air characteristic signal, commands an air conditioning subsystem of the air purification subsystem to adjust a pressure of outside air supplied to an environment by altering the amount of outside air introduced into the environment.

13. A method for controlling an occupant comfort level in an environment, comprising:
sensing outside air contaminants in outside air entering the environment supplied through engine or APU bleeds or other air sources including ground supplies and electric compressors;
comparing the sensed outside air contaminants against an outside air contaminant threshold;
wherein the outside air contaminant threshold is calculated according to contaminant concentration equivalents versus contaminant population percentiles;
wherein the outside air contaminant threshold is a predicted threshold at contaminant population percentiles;
sensing recirculated air contaminants in recirculated air entering the environment;
comparing the sensed recirculated air contaminants against a recirculated air contaminant threshold;
sensing carbon dioxide in recirculated air exiting the environment;
comparing the sensed carbon dioxide against a carbon dioxide threshold;
sensing temperature of mixed air in the environment, wherein the mixed air includes the outside air supplied through engine or APU bleeds or other air sources including ground supplies and electric compressors, and the recirculated air;

comparing the sensed temperature against a temperature threshold;
sensing pressure of the mixed air in the environment;
comparing the sensed pressure against a pressure threshold;
commanding one of:
  a change in an amount of outside air supplied through engine or APU bleeds or other air sources including ground supplies and electric compressors, entering the environment;
  a change in an amount of recirculated air entering the environment; and
  a change in temperature of mixed air entering the environment;
wherein changing the amount of outside air, changing the amount of recirculated air, and changing the temperature of mixed air includes:
  setting a flow control valve to a maximum level if at least one condition exists of: the sensed pressure is below the pressure threshold, the sensed temperature is above the temperature threshold, and the sensed carbon dioxide is above the carbon dioxide threshold; and
  adjusting a recirculation flow from a recirculation fan inversely with outside air flow to maintain a constant ventilation flow.

14. The method of claim 13, wherein commanding a change in amount of outside air supplied through engine or APU bleeds or other air sources including ground supplies and electric compressors, includes commanding the flow control valve upstream of the environment.

15. The method of claim 13, wherein commanding a change in an amount of recirculated air includes commanding a mix manifold upstream of the environment.

16. The method of claim 13, wherein commanding a change in temperature of mixed air includes commanding an air conditioning subsystem upstream of the environment.

17. The method of claim 13, wherein commanding a change in pressure of mixed air includes commanding an air conditioning subsystem upstream of the environment.

18. The method of claim 13, further comprising commanding concurrent changes in both outside air supplied through engine or APU bleeds or other air sources including ground supplies and electric compressors, and mixed air.

* * * * *